July 9, 1963 — C. GOULD — 3,096,553
GARMENT FASTENER
Filed Aug. 10, 1961
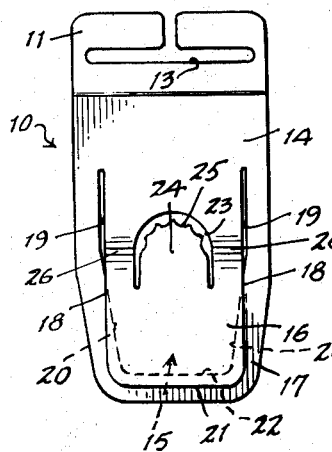
Fig. 1.
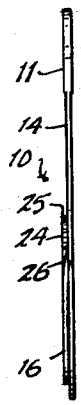
Fig. 2.
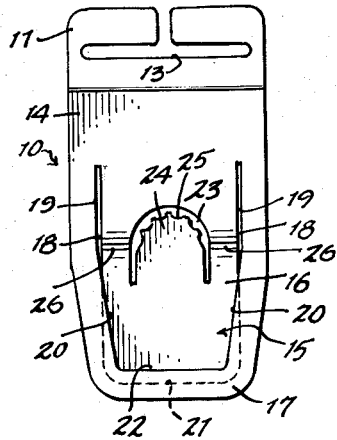
Fig. 3.
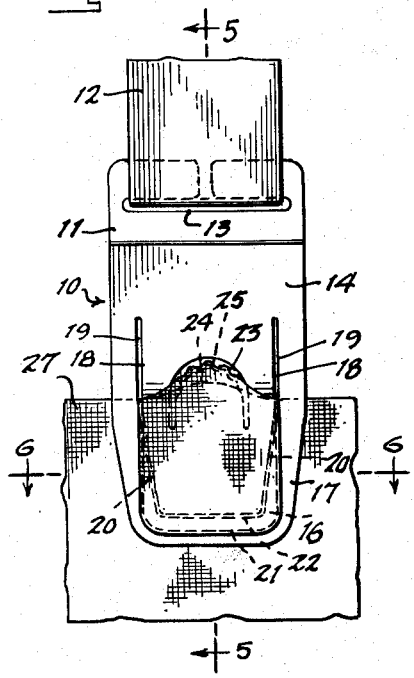
Fig. 4.
Fig. 5.
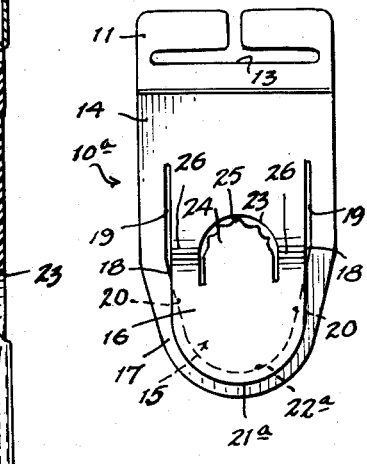
Fig. 7.
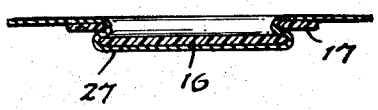
Fig. 6.
INVENTOR.
CHARNA GOULD
BY
ATTORNEY.

United States Patent Office 3,096,553
Patented July 9, 1963

3,096,553
GARMENT FASTENER
Charna Gould, 280 Badger Ave., Millburn, N.J.
Filed Aug. 10, 1961, Ser. No. 130,558
4 Claims. (Cl. 24—246)

The present invention relates to a garment fastener, particularly of the hose supporting type, and has for an object to provide a one-piece fastener which may be economically molded from plastic material, and which in use will lie substantially flat upon the body, as distinguished from the conventional type of hose supporter employing a projecting button mounted upon a flexible tape and cooperating with a wire loop. Another object is to provide a fastener having integral means for detachably connecting it to the elastic tape loop usually provided upon girdles or similar garments for the attachment of hose supporters. A further object is to provide a fastener which will provide an interlocking connection with the extremely sheer material used in ladies' hose without likelihood of damage thereto, and which may be easily and quickly operated to either secure the garment or release it.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a front elevation of the fastener according to the invention;

FIG. 2 is a side elevation;

FIG. 3 is a rear elevation;

FIG. 4 is a front elevation showing the fastener connected to an elastic tape loop and secured to a stocking top;

FIG. 5 is a vertical sectional view on an enlarged scale taken along the line 5—5 of FIG. 4;

FIG. 6 is a horizontal sectional view on an enlarged scale taken along the line 6—6 of FIG. 4; and FIG. 7 is a front elevation of a modified form of the fastener.

Referring to the drawings, the fastener according to the embodiment of the invention illustrated therein comprises a one-piece plastic member 10 preferably produced by injection molding, the plastic material being of any suitable type, for instance, polypropylene, polyethylene, nylon, etc., which has the characteristic after molding of being flexible while maintaining a desired degree of stiffness and which has a semi-hard consistency to provide a smooth, soft-to-the-touch surface.

The plastic member 10 comprises an upper part 11 for attaching to an elastic tape loop 12 of a garment, as seen in FIGS. 4 and 5, and is provided for this purpose with an inverted T-shaped slot 13 having the stem of the T centrally disposed and opening to the upper edge so that the tape loop 12, which is usually formed of flexible fabric material, may be readily slipped into place by first entering it through the stem of the T and then positioning it in flat relation in the transverse part of the T, the retaining portions at the sides of the stem being capable of flexing to facilitate the insertion of the loop. In this arrangement the retaining portions of the fastener engaged in the loop are symmetrically arranged so that the pull is evenly distributed at each side and thus there is no likelihood of accidental disengagement and the part 11 may be relatively thin without likelihood of breakage. The body part 14 of the fastener extends downwardly from the part 11 and is preferably relatively thinner than the part 11, so that while the latter has the necessary strength for connecting to the tape loop the body part has a high degree of flexibility.

The body part is provided with a generally U-shaped cutout 15 and within the cutout there is provided an integral tongue 16 which partially overlaps the marginal portion 17 of the body part surrounding the cutout 15. To this end the side edges 18 of the tongue 16 are parallel, and the side edges of the cutout 15 are parallel to and outwardly spaced from the side edges of the tongue along their upper portions 19 and converge along their lower portions 20 so that the latter extend beneath the side margins of the lower part of the tongue. Also the transverse lower edge 21 of the tongue extends below and is parallel to the lower transverse edge 22 of the cutout 15 so that the lower margin of the tongue overlaps the lower margin of the body part.

At a point substantially in line with the upper ends of the convergent lower portions 20 of the side edge of the cutout 15 the tongue is provided with a slot 23 of inverted U-shape defining an upwardly directed tab 24 preferably having serrations 25 in its upper edge, for a purpose presently to more fully appear. At each side of the slot 23 the marginal side portions of the tongue are provided with bends 26—26 which dispose the lower portion of the tongue in substantially parallel engaged relation with the forward side of the body part with the tab 24 in the plane of the lower portion of the tongue and outwardly offset from the outer edge of the slot 23, for a purpose presently to more fully appear.

In the operation of fastening the stocking top 27, the latter is pressed with a finger forwardly through the cutout 15 causing the tongue 16 to be flexed forwardly to a point where the portion of the stocking top pressed through the cutout is engaged over the forward side of the tongue. Thereupon the edge of the stocking top overlying the tongue is hooked over the tab 24 in engagement with its serrated edge surface 25, at which point the tension on the fastener created by the upward pull of the elastic tape loop 12 and the downward pull of the stocking draws the fastened portion of the stocking top tightly against the forward surface of the tongue with the stocking material extending about the edge of the tongue, between the overlapping surfaces of the tongue and the body portion, and about the edge of the cutout 15, as clearly shown in FIGS. 4–6, creating a snubbing relation between the stocking top and the fastener which in cooperation with its hooked connection with the tab 24 prevents slippage. At the same time downward pulling force upon the stocking top against its hooked engagement with the tab 24 presses the marginal portion of the tongue against the underlying marginal parts of the body portion to increase the snubbing action. Thus the stocking top is securely held and at the same time the fastener lies in relatively flat relation against the body. In order to disconnect the stocking top it is only necessary to unhook it from the tab 24 whereupon it can be readily slipped out of interlocking engagement with the tongue.

In FIG. 7 there is shown a modification in which the lower edge of the body part 14 of the fastener 10a is rounded and the lower edges 21a of the tongue 16 and 22a of the cutout 15 are rounded in concentric relation thereto.

What is claimed is:

1. A one-piece garment fastener formed of flexible plastic material comprising an upper end part for securing to a supporting garment, a body part integral with and depending from said upper end part having a cutout surrounded by side and bottom margin edge portions, a downwardly directed tongue integral with and flexibly connected to said body part at the upper end of said cutout having side and bottom marginal edge portions overlapping said side and marginal edge portions of said body part, whereby a supported garment is adapted to have a top marginal edge portion thereof pressed forward through said cutout to overlie the forward side of said tongue with portions of the garment interposed between the overlapped surfaces of said tongue and body parts, and said tongue having an inverted U-shaped slit defining an upwardly extending tab for hooking engagement of the upper edge portion of said garment overlying said tongue.

2. The invention as defined in claim 1 further characterized in that the upper edge of said tab is serrated.

3. A one-piece garment fastener formed of flexible plastic material comprising an upper end part for securing to a supporting garment, a body part integral with and depending from said upper end part having a cutout surrounded by side and bottom marginal edge portions, a downwardly directed tongue integral with and flexibly connected to said body part at the upper end of said cutout having side and bottom marginal edge portions overlapping said side and marginal edge portions of said body part, whereby a supported garment is adapted to have a top marginal edge portion thereof pressed forward through said cutout to overlie the forward side of said tongue with portions of the garment interposed between the overlapped surfaces of said tongue and body parts, said tongue having an inverted U-shaped slit defining an upwardly extending tab for hooking engagement of the upper edge portion of said garment overlying said tongue, and the side portions of said tongue at the respective sides of said slit having bends disposing the portion of said tongue below said bends at the forward side of said body part in substantially parallel relation thereto.

4. The invention as defined in claim 3 wherein said tab lies in the plane of said portion of said tongue below said bends.

References Cited in the file of this patent

UNITED STATES PATENTS

| | | |
|---|---|---|
| 1,597,188 | Gaunt | Aug. 24, 1926 |
| 1,661,590 | Woods | Mar. 6, 1928 |
| 1,868,644 | Tompkins | July 26, 1932 |
| 2,021,619 | Waters et al. | Nov. 19, 1935 |
| 2,745,163 | Van Buren | May 15, 1956 |
| 2,843,909 | Eilertsen | July 22, 1958 |

FOREIGN PATENTS

| | | |
|---|---|---|
| 355,731 | Germany | July 1, 1922 |
| 456,653 | Great Britain | Nov. 12, 1936 |
| 765,862 | France | Mar. 31, 1934 |
| 417,347 | Great Britain | Oct. 3, 1934 |